(12) United States Patent
Wang et al.

(10) Patent No.: US 11,200,204 B2
(45) Date of Patent: Dec. 14, 2021

(54) METHOD, DEVICE AND COMPUTER PROGRAM PRODUCT FOR SEARCHING A FILE

(71) Applicant: EMC IP Holding Company LLC, Hopkinton, MA (US)

(72) Inventors: Yi Wang, Chengdu (CN); Qingxiao Zheng, Chengdu (CN); Lanjun Liao, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 215 days.

(21) Appl. No.: 16/285,175

(22) Filed: Feb. 25, 2019

(65) Prior Publication Data

US 2020/0117638 A1     Apr. 16, 2020

(30) Foreign Application Priority Data

Oct. 12, 2018     (CN) .......................... 201811191427.9

(51) Int. Cl.
| | | |
|---|---|---|
| *G06F 16/14* | (2019.01) | |
| *G06F 16/13* | (2019.01) | |
| *G06F 16/11* | (2019.01) | |
| *G06F 11/14* | (2006.01) | |

(52) U.S. Cl.
CPC ........ *G06F 16/152* (2019.01); *G06F 11/1451* (2013.01); *G06F 16/128* (2019.01); *G06F 16/137* (2019.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 2010/0268957 A1* | 10/2010 | Suzuki | ................ | H04L 9/3066 713/176 |
| 2018/0260405 A1* | 9/2018 | Shantharam | ........ | G06F 12/0873 |

* cited by examiner

*Primary Examiner* — Amresh Singh
(74) *Attorney, Agent, or Firm* — Womble Bond Dickinson (US) LLP (57) ABSTRACT

Embodiments of the present disclosure provide method, device and computer program product for file search. The method for file search comprises: determining a hash value associated with an identification of a file to be searched; determining, from a plurality of candidate location chains, a target location chain associated with the hash value; determining, from the target location chain, a target element based on the identification, the target element indicating an address of the file to be searched in a memory; and acquiring the file from the memory based on the address.

15 Claims, 7 Drawing Sheets

METHOD, DEVICE AND COMPUTER PROGRAM PRODUCT FOR SEARCHING A FILE

CROSS-REFERENCE TO RELATED APPLICATION

This patent application claims priority, under 35 U.S.C. § 119, of Chinese Patent Application No. 201811191427.9, filed Oct. 12, 2018, entitled "METHOD, DEVICE AND COMPUTER PROGRAM PRODUCT FOR SEARCHING A FILE."

FIELD

Embodiments of the present disclosure generally relate to the field of storage systems, and more specifically, to method, device and computer program product for file search.

BACKGROUND

In many backup systems (e.g., Avamar backup system), there is an important function known as creating Snapview backup, which function expects to use existing backup files in the backup server to create new backups. In this backup system, for example, a server (such as DataDomain server) is usually connected. The backup file data are usually stored in this server, while the backup metadata are normally stored in a further backup server (e.g., Avamar server). The backup metadata contain overall backup information, such as backup file size, creating time, and the like. The backup file data contain the content of the backup file data.

Because the file data are stored, for example, in the DataDomain server, it is required to acquire a location of the file in the server in order to create the Snapview. After acquiring the location of the file in the server, a new Snapview backup can be created using the existing files.

However, to search the file location, the existing solution compares the file name of a file to be searched with file names of a plurality of existing files one by one until a complete match is found. Although current solution can work, it is obviously not an efficient way. This is because it will take a long time when searching one by one in a case that there are massive files, which affects the performance of creating the Snapview backup. Therefore, a more efficient file search method is desired to shorten the time required for the searching procedure.

SUMMARY

Various embodiments of the present disclosure provide method, device and computer program product for file searching.

A first aspect of the present disclosure provides a file searching method, comprising: determining a hash value associated with an identification of a file to be searched; determining, from a plurality of candidate location chains, a target location chain associated with the hash value; determining, from the target location chain, a target element based on the identification, the target element indicating an address of the file to be searched in a memory; and acquiring the file from the memory based on the address.

A second aspect of the present disclosure provides a task management device, comprising: a processing unit; a memory coupled to the processing unit and stored with instructions, the instructions, when executed by the processing unit, perform following actions of: determining a hash value associated with an identification of a file to be searched; determining, from a plurality of candidate location chains, a target location chain associated with the hash value; determining, from the target location chain, a target element based on the identification, the target element indicating an address of the file to be searched in a memory; and acquiring the file from the memory based on the address.

A third aspect of the present disclosure provides a computer program product for task management. The computer program product is tangibly stored on a non-transitory computer-readable medium and includes machine-executable instructions, the machine-executable instructions, when executed, causing a machine to perform steps of the method according to the first aspect of the present disclosure.

BRIEF DESCRIPTION OF THE DRAWINGS

The drawings described herein are provided to further explain the present disclosure and constitute a part of the present disclosure. Example embodiments of the present disclosure and their descriptions are provided for explaining the present disclosure, rather than restricting the present disclosure in an inappropriate way.

In the drawings, same or similar reference signs are used for representing same or similar elements.

DETAILED DESCRIPTION OF EMBODIMENTS

The principle of the present disclosure is now described with reference to the several example embodiments shown in the drawings. Although the drawings illustrate the example embodiments of the present disclosure, it should be understood that the embodiments are described merely to facilitate those skilled in the art to better understand and further implement the present disclosure and is not intended for limiting the scope of the present disclosure in any manner.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like can refer to different or same objects. Other definitions, explicit and implicit, may be included below.

In many backup systems (e.g., Avamar backup system), Snapview backup makes the management of the backup more flexible. For example, in a disk image backup solution, a basic disk image file and an altered block file are created at different time. Accordingly, 2 backups are created for them, respectively. But when the customers intend to restore the latest image file, they need to restore the image file, which is inconvenient for the customers because they need to find the basic image file backup and a corresponding altered block backup. With Snapview feature, customers can create a Snapview backup for the image file and the altered block file, and then can restore everything from one Snapview backup without searching them, respectively.

Another example is that customers may want to extend expiration time of a certain file. Expiration time is the time when the backup is deleted from a backup server. In this solution, the Snapview backup can be executed and a new expiration time may be set for the Snapview backup. Meanwhile, other files can be deleted after the original expiration time, which will save a lot of storage space because it is unnecessary to back up any data after the expiration time. Instead, only the specified file data in the Snapview backup will be kept until the new expiration time.

Figure 1:
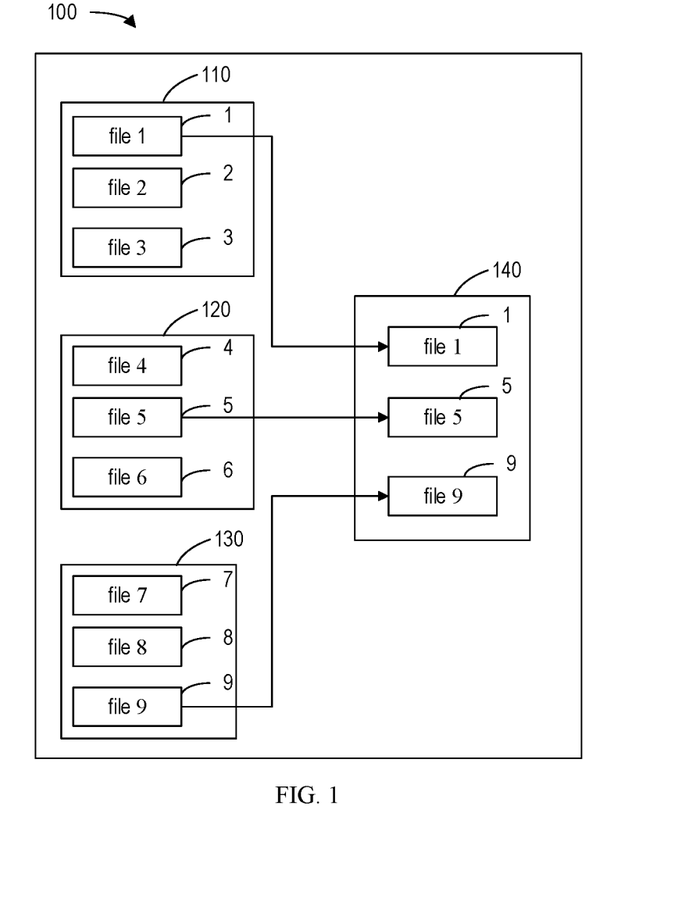
FIG. 1 illustrates a block diagram of an example backup server.

FIG. 1 illustrates a block diagram of an example backup server 100. According to FIG. 1, the backup server 100 contains three backups 110, 120 and 130, where each backup also stores three files, that is, file 1, file 2, and file 3 in the first backup 110, file 4, file 5 and file 6 in the second backup 120, and file 7, file 8 and file 9 in the third backup 130. In the example shown by FIG. 1, the Snapview backup 140 is a snapshot backup based on the file 1, file 5 and file 9. It should be noted that the number of backups in the backup server 100 and the number of files in each backup as illustrated in FIG. 1 are exemplary only and those skilled in the art will appreciate that the number of backups different than the illustrated number (i.e., 3) of backups shown in FIG. 1 is possible. Meanwhile, each backup may also store different number of files.

In the above backup system (e.g., Avamar backup system), there is usually an attached server (such as DataDomain server). The backup file data are usually stored in this server, while the backup metadata are often stored in another backup server (e.g., Avamar server). The backup metadata contain overall backup information, such as backup file size, creating time, and the like. The backup file data contain the content of the backup file data.

Figure 2:
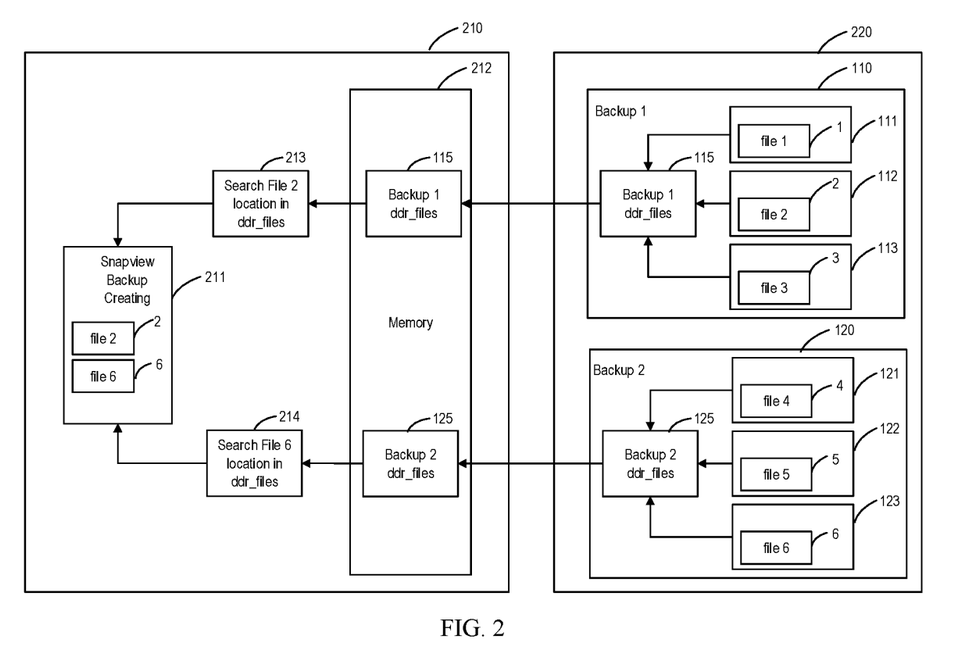
FIG. 2 illustrates a backup fie location and ddr_files.

A further explanation is provided below by taking the DataDomain server as the example. In order to acquire the file location, it is firstly required to understand how the file data are stored in the DataDomain server. There is a special format container called "raw format container" (hereinafter referred to as "container"). The raw format container is widely used for image backup. If the file data are stored in the raw format container, there will be a file named "ddr_files" in the DataDomain server, and this file describes the location of the backup file in the DataDomain server. The "ddr_files" file will describe the container where the file is located and the file location offset in the container. To search in the ddr_files, the backup server will load, in the server memory, the content of the "ddr_files," and search in the memory. FIG. 2 illustrates the backup file location and the ddr_files.

In the example shown by FIG. 2, the server 220 represents the DataDomain server and the server 210 represents the Avamar server. According to FIG. 2, the server 220 stores two backups therein, i.e., backup 110 and backup 120, where the backup 110 contains 3 raw format containers 111, 112 and 113. The file 1, file 2 and file 3 are respectively contained in the corresponding raw format containers. Likewise, the backup 120 also contains 3 raw format containers 121, 122 and 123, and the file 4, file 5 and file 6 are respectively contained in the corresponding raw format containers. It is also to be noted that although each container only contain one file in this example for the sake of clarity, each container may also contain a plurality of files.

In this example, in order to create a new Snapview backup 211 with the existing file 2 and file 6, the server 210 will load, in its memory 212, the contents of the "ddr_files," wherein blocks "115" and "125" indicate contents of the "ddr_files" of the backup 110 and contents of the "ddr_files" of the backup 120, respectively. Block 213 demonstrates a procedure of searching the file 2 in the contents 115 of the "ddr_files," and block 214 shows a procedure of searching the file 6 in the contents 215 of the "ddr_files."

Figure 3:
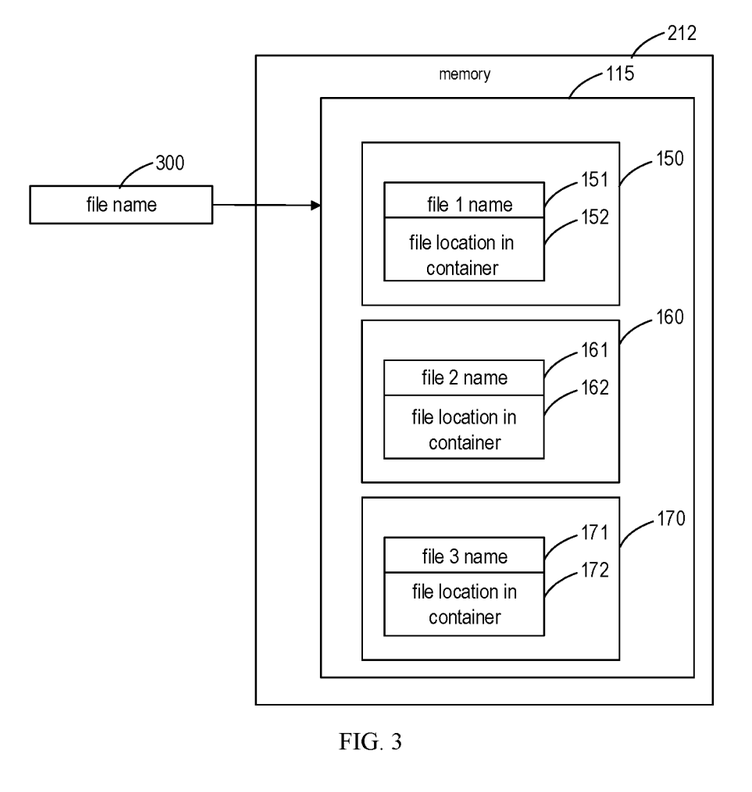
FIG. 3 illustrates a traditional file searching method.

However, to search the file location, in the existing solutions, it is needed to compare a file name to be searched with a plurality of file names in the "ddr_files" one by one, until an exactly matched item is found. FIG. 3 schematically illustrates this traditional file searching method. As shown, the contents 115 of one "ddr_files" loaded into the memory 212 (shown in FIG. 2), for example, include three elements 150, 160 and 170, and the three elements respectively contain a file name 151 of the file 1, a file name 161 of the file 2 and a file name 171 of the file 3. In addition, the elements also respectively contain the storage locations 152, 162 and 172 of these files in the container. When the location of a file name 300 is to be searched, it is required to compare the file name 300 with the corresponding file names 151, 161 and 171 contained in each element one by one until an element exactly matched with the file name is found.

It can be seen that although this current solution can work, it is obviously not an efficient solution. For example, when there are far more than 3 elements in the "ddr_files," the way of searching one by one will take a long time, which affects the performance of creating the Snapview backup. For example, if there are more than 1000 elements in the contents 115 of the "ddr_files" and it is required to perform Snapview backup on 700 files, then for each file in the Snapview backup, the search for the "ddr_files" containing the entire 1000 items needs to be implemented for 500 times on average, and a total of 500*700 times of comparisons are required with the time complexity of O(N). Therefore, the traditional searching solution as shown in FIG. 3 will negatively impact the performance of creating the Snapview backup.

Various embodiments of the present disclosure provide a more efficient method for file searching and such method can significantly save the time required for the searching procedure. The details will be described below with reference to the "ddr_files."

Figure 4:
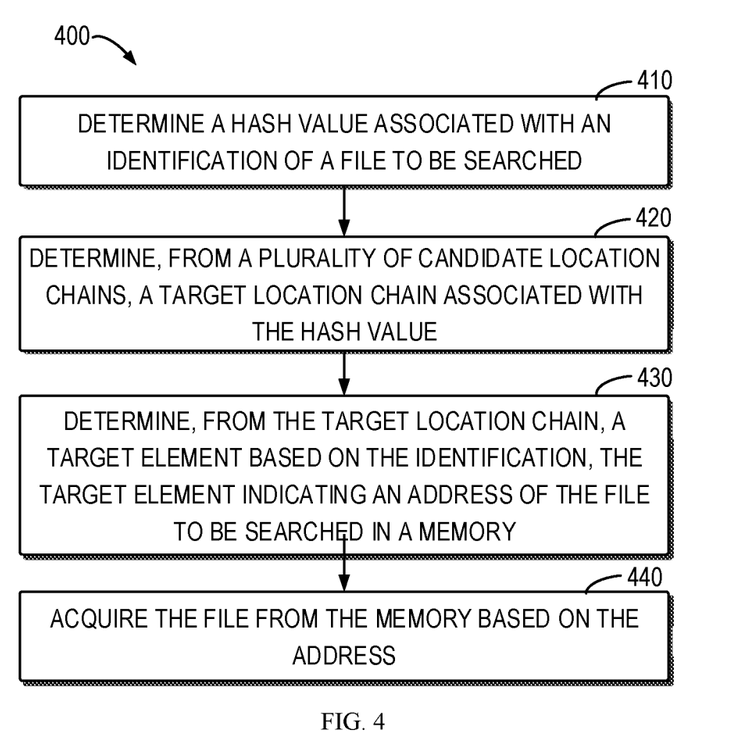
FIG. 4 illustrates a flowchart of a file searching method according to embodiments of the present disclosure.

FIG. 4 illustrates a flowchart of a file searching method 400 in accordance with various embodiments of the present disclosure. At 410, a hash value associated with an identification of a file to be searched is determined. Here, the identification of a file to be searched can be the file name of the file, for example. At 420, a target location chain associated with the hash value is determined from a plurality of candidate location chains. At 430, a target element is determined in the target location chain based on the identification, the target element indicating an address of the file to be searched in the memory. For example, the target element can include the file name of the file to be searched and the address of the file to be searched in the memory. At 440, a file is acquired from the memory based on the address.

In the solution provided by the present disclosure, the file to be searched is associated with the target location chain including this file to be searched by means of the hash value, such that in the subsequent searching procedure, the search is only directed at the one or more elements in the associated location chain (i.e., that particular location chain containing the target element indicating the address of the file in the memory). In this way, the search for a large amount of other irrelevant elements (i.e., elements included in other location chains) is avoided, which accordingly significantly reduces the number of search.

In some embodiments, the step 420 includes: selecting one candidate location chain from a plurality of candidate location chains. The selected candidate location chain corresponds to one candidate hash value, and the candidate hash value is determined based on the hash value corresponding to the one or more elements in the selected candidate location chain. In other words, all elements in the candidate location chains may share the same hash value. In this case, when the determined hash value matches with the candidate hash value, the selected candidate location chain is determined as the target location chain.

In some embodiments, determining the target element from the target location chain includes: determining candidate identifications (e.g., candidate file names) included in the elements of the target location chain; and when the identification (such as file name to be searched) is matched with one of the candidate identifications, the element corresponding to matched candidate identification is determined as a target element.

In order to implement the efficient file searching method as described above, in some practical embodiments, it is usually required to first create a plurality of location chains as well as address arrays associated with the plurality of location chains. For example, it is often required to allocate an array with the maximum index of 0xFFF (it is here assumed that the array is P[0xFFF]) in the memory (for example, memory 212 as illustrated in FIG. 2) and an empty location chain is allocated for each element in the array. Consequently, a hash value is determined for each file already stored in the "ddr_files". The determination of the hash value is identical to the determination of the hash value in the above described file searching procedure. At last, an address of each element in the "ddr_files" is acquired and added into the location chain. So far, the establishment of a plurality of location chains and the address arrays associated with the plurality of location chains has been completed.

Replacing the file name with the hash value can achieve the following advantageous technical effects. That is, if the file name is directly used as the index, the uniform distribution of the file names in the array may not be guaranteed, but the hash value can make the distribution uniform.

In some embodiments, the hash value can be a hash value directly calculated based on the identification. For example, the hash value may be calculated via the SHA-1 algorithm. In some embodiments, the hash value can be a truncated hash value. In this case, an initial hash value can be first calculated based on the identification, and then a predetermined number of consecutive bits are selected from the initial hash value to obtain a truncated hash value.

In some examples, selecting a predetermined number of consecutive bits from the initial hash value can include: selecting the predetermined number of consecutive bits starting from a lowest bit of the initial hash value. Taking the SHA-1 hash algorithm as an example, the initial hash value has 160 bits, and 12 consecutive bits starting from the lowest bit of the 160-bit hash value are selected as the truncated hash value.

Using the truncated 12-bit hash value, rather than the full hash value, is because the full hash value as the index will occupy too much memory space. Taking the SHA-1 hash algorithm as an example, the full hash value has 160 bits. In this case, if the 160 bits serve as the array index, the size of the array will be very large, as the array contains too many elements. It has been proved that the truncated hash values are uniformly distributed. Therefore, even the 12-bit truncated hash value is used, the address array will also be uniformly used. Generally, less than 4000 files are used for creating the Snapview backup. Accordingly, the 12-bit array index can cover most Snapview backup cases, and is also long enough to avoid excessive hash collisions.

For example, there is a file A, and a hash value of the file A is first calculated, and the truncated 12-bit hash value of the file A is 0x123. Meanwhile, the address of the element is acquired in the "ddr_files," and the location chain is then found by checking the value of the array element P[0x123], and this element of the "ddr_files" is added to the location chain.

Figure 5:
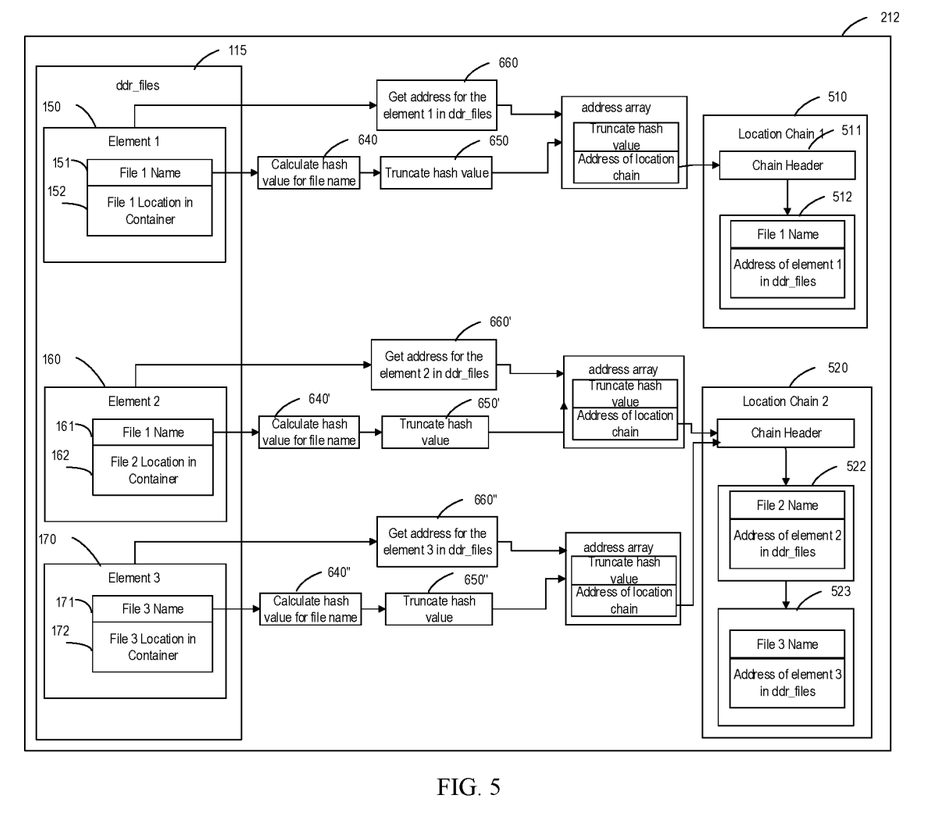
FIG. 5 illustrates a procedure of creating an address array and a location chain in accordance with embodiments of the present disclosure.

FIG. 5 illustrates a procedure of creating an address array and a location chain in accordance with embodiments of the present disclosure. As shown in FIG. 5, the contents 115 of one "ddr_files" include three elements 150, 160 and 170, and the three elements respectively contain the file name 151 of the file 1, the file name 161 of the file 2 and the file name 171 of the file 3, as well as the storage locations 152, 162 and 172 of these files in the container.

Taking the element 150 corresponding to the file 1 as the example, at block 640, a hash value for the file name 151 of the file 1 is determined. Then, at the block 650, a truncated hash value is obtained. Meanwhile, at block 660, the address of the element 150 is acquired and is then added into the corresponding location chain 510. Operations executed for other two elements 160 and 170 are similar to those executed for the element 150. Specifically, the corresponding operations for the hash value determination are indicated separately by blocks 640' and 640"; the corresponding operations for acquiring the truncated hash value are represented separately by blocks 650' and 650"; and the corresponding operations for acquiring the element address are represented separately by blocks 660' and 660".

Continuing to refer to FIG. 5. The location chain 510 further includes a location chain header 511 and a location chain element 512, and the location chain element contains the file name of the file 1 and the address of the element 150 in the "ddr_files." The location chain 520 further includes a location chain header 521 and two location chain elements 522 and 523, and the location chain element 522 contains the file name of the file 2 and the address of the element 160 in the "ddr_files." The location chain element 523 contains the file name of the file 3 and the address of the element 170 in the "ddr_files." In addition, the memory 212 also includes three address array elements, and each address array contains truncated hash value and an address of the location chain.

It is noted that the location chain 520 includes two location chain elements 522 and 523, which means that the file names of the file 2 and file 3 share the same truncated hash value. Accordingly, the file 2 and file 3 are classified into the same location chain in the procedure of creating the location chain. It is to be noted that one location chain can include more than two location chain elements (for example, 4, 6 or more). Of course, the location chain can also include only one location chain element, like the location chain 510, which is dependent on the obtained truncated hash value.

Figure 6:
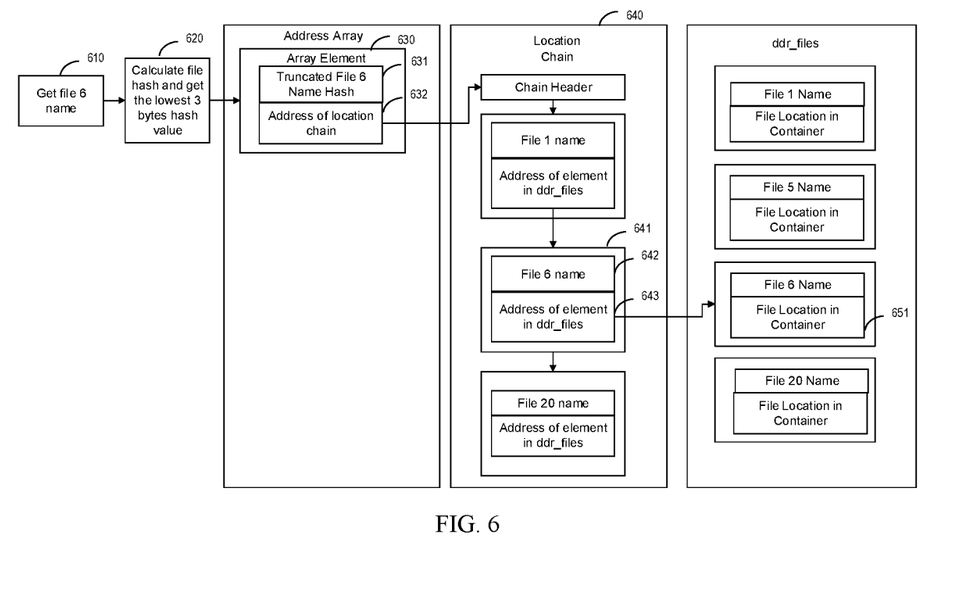
FIG. 6 illustrates a file searching method according to an embodiment of the present disclosure.

Once the address array and the location chain are created, elements in the "ddr_files" can be searched using the address array and the location chain. FIG. 6 describes a method for file search in accordance with one embodiment of the present disclosure. To search a file in the "ddr_files," a file name of the file 6 is obtained at 610, and the hash value of the file name is calculated and a truncated hash value is obtained at block 620. Subsequently, a corresponding location chain 640 is found using the address array 630. In the location chain 640, the file name to be searched is compared with the file names of all elements in the location chain 640 one by one, until an exactly matched element 641 is found through the file name 642. Once the matched element 641 is found in the location chain, an address 651 of the element in the container can be directly found in the "ddr_files" through an address 643 of the element in the "ddr_files" included in the element 641. Because the number of elements in the location chain is far smaller than the total number of elements in the "ddr_files," the searching procedure is much faster than the traditional solution, which searches the elements one by one in the "ddr_files."

In sum, various embodiments provided by the present disclosure can achieve many advantageous technical effects as follows.

First, the performance of the Snapview backup is significantly improved. The new solution reduces the complexity from O(N) to O(1), which saves a lot of time for searching items in the "ddr_files." Therefore, the performance is improved significantly.

Second, the comparison algorithm based on the initial file name is now changed to a comparison method based on the truncated hash value, which ensures the uniform distribution of the new algorithm.

Third, the memory usage for the search is saved. In the new solution, the whole hash value is not used as the array index, as it might result in many array elements, which consumes a large amount of memory space. Instead, only the lowest 12 bits are utilized to create a location chain, thereby saving a lot of memory space. Meanwhile, it has already been proved that the truncated 12 bits are uniformly distributed.

In addition, hash collision is resolved. The hash collision may still exist for the same hash regardless a full hash value or a truncated low 12-bit hash value being used. In this new solution, the location chain is employed for the same hash value, which can resolve hash collision and enable a smooth distribution of the location chain.

Figure 7:
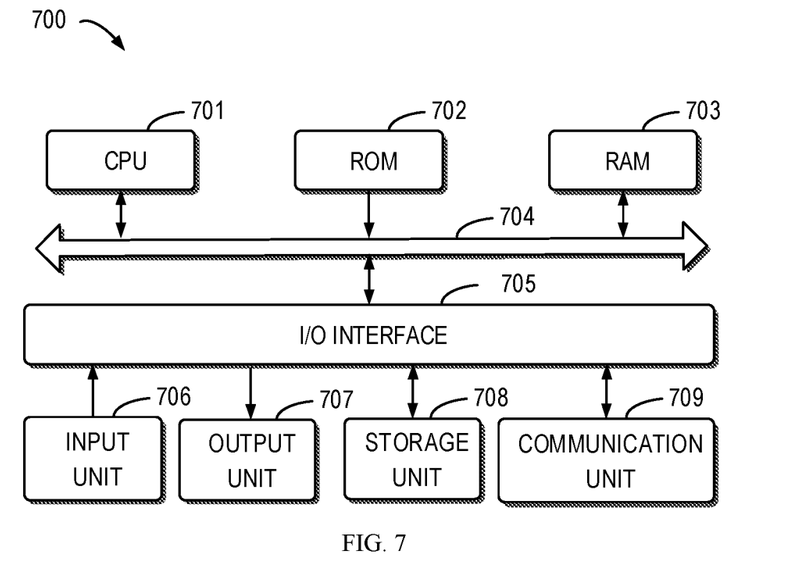
FIG. 7 illustrates a schematic block diagram of a device for implementing embodiments of the present disclosure.

FIG. 7 illustrates a schematic block diagram of a device 700 for implementing embodiments of the present disclosure. As shown, the device 700 includes a central processing unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as method 400, can be executed by the processing unit 701. For example, in some embodiments, the method 400 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the above described method 400 can be implemented. Alternatively, in other embodiments, the CPU 701 also can be configured in any other suitable ways to implement the above procedure/method.

It should be appreciated the above detailed embodiments of the present disclosure are provided only for illustrating or explaining the principles of the present disclosure by examples rather than restricting the present disclosure. Therefore, any amendments, equivalent substitutions, improvements and the like, without deviating from the spirit and the scope of the present invention, should be included within the protection scope of the present invention. Meanwhile, the claims attached to the present disclosure are intended to cover all changes and modifications falling within the scope and the boundary of the claims or within the equivalents of the scope and the boundary thereof.

We claim:

1. A method of searching a file, comprising:
   determining a hash value associated with an identification of a file to be searched via SHA-1 algorithm;
   generating a plurality of candidate location chains and a plurality of address arrays associated with the plurality of candidate location chains, each of the plurality of address arrays storing the hash value and an address of the plurality of candidate location chains, wherein an address of a candidate element in the file to be searched is added into the plurality of candidate location chains;
   determining, from the plurality of candidate location chains, a target location chain associated with the hash value;
   determining, from the target location chain, a target element based on the identification, the target element including a file name and an address of the target element for the file to be searched in a memory, the address of the target element in the target location pointing to an address of a corresponding target element in a container of the file to be searched, wherein determining the target location chain comprises:
   selecting a candidate location chain from the plurality of candidate location chains based on the address of the plurality of candidate location chains stored in the plurality of address arrays, the selected candidate location chain having a candidate hash value, the candidate hash value being determined based on a particular hash value corresponding to an element in the selected candidate location chain, and
   in response to the particular hash value being matched with the candidate hash value, determining the selected candidate location chain as the target location chain; and
   acquiring the file from the memory based on the address of the target element.

2. The method of claim 1, wherein determining the hash value comprises:
   calculating an initial hash value based on the identification; and
   selecting, from the initial hash value, a predetermined number of consecutive bits as the hash value.

3. The method of claim 2, wherein selecting from the initial hash value the predetermined number of consecutive bits comprises:

selecting the predetermined number of consecutive bits starting from a lowest bit of the initial hash value.

4. The method of claim 3, wherein the initial hash value has 160 bits, and wherein the predetermined number of consecutive bits is 12.

5. The method of claim 2, wherein selecting from the initial hash value the predetermined number of consecutive bits comprises:
selecting the predetermined number of consecutive bits starting from a lowest bit of the initial hash value.

6. The method of claim 1, wherein determining from the target location chain the target element comprises:
determining candidate identifications comprised in respective elements of the target location chain; and
in response to the identification being matched with one of the candidate identifications, determining an element corresponding to the matched candidate identification as the target element.

7. The method of claim 1, further comprising:
acquiring a location of the file to be searched in a backup server, wherein the file to be searched is utilized for a backup process; and
generating a backup for an image file and an altered block file of the backup process based on the file to be searched.

8. The method of claim 7, wherein the location of the file to be searched is represented by a ddr_file in the backup server, and wherein the file to be searched is stored in the container.

9. A device for searching a file, comprising:
a processing unit;
a memory coupled to the processing unit and stored with instructions, the instructions, when executed by the processing unit, perform following actions of:
determining a hash value associated with an identification of a file to be searched via SHA-1 algorithm;
generating a plurality of candidate location chains and a plurality of address arrays associated with the plurality of candidate location chains, each of the plurality of address arrays storing the hash value and an address of the plurality of candidate location chains, wherein an address of a candidate element in the file to be searched is added into the plurality of candidate location chains;
selecting, from the plurality of candidate location chains, a target location chain associated with the hash value;
determining, from the target location chain, a target element based on the identification, the target element including a file name and an address of the target element for the file to be searched in the memory, the address of the target element in the target location pointing to an address of a corresponding target element in a container of the file to be searched, wherein determining the target location chain comprises:
selecting a candidate location chain from the plurality of candidate location chains based on the address of the plurality of candidate location chains stored in the plurality of address arrays, the selected candidate location chain having a candidate hash value, the candidate hash value being determined based on a particular hash value corresponding to an element in the selected candidate location chain, and
in response to the particular hash value being matched with the candidate hash value, determining the selected candidate location chain as the target location chain; and acquiring the file from the memory based on the address of the target element.

10. The device of claim 9, wherein determining the hash value comprises:
calculating an initial hash value based on the identification; and
selecting, from the initial hash value, a predetermined number of consecutive bits as the hash value.

11. The device of claim 10, wherein selecting from the initial hash value the predetermined number of consecutive bits comprises:
selecting the predetermined number of consecutive bits starting from a lowest bit of the initial hash value.

12. The device of claim 9, wherein determining from the target location chain the target element comprises:
determining candidate identifications comprised in respective elements of the target location chain; and
in response to the identification being matched with one of the candidate identifications, determining an element corresponding to the matched candidate identification as the target element.

13. A non-transitory machine-readable medium having instructions stored therein, which when executed by a processor, cause the processor to perform operations, the operations comprising:
determining a hash value associated with an identification of a file to be searched via SHA-1 algorithm;
generating a plurality of candidate location chains and a plurality of address arrays associated with the plurality of candidate location chains, each of the plurality of address arrays storing the hash value and an address of the plurality of candidate location chains, wherein an address of a candidate element in the file to be searched is added into the plurality of candidate location chains;
determining, from the plurality of candidate location chains, a target location chain associated with the hash value;
determining, from the target location chain, a target element based on the identification, the target element including a file name and an address of the target element for the file to be searched in a memory, the address of the target element in the target location pointing to an address of a corresponding target element in a container of the file to be searched, wherein determining the target location chain comprises:
selecting a candidate location chain from the plurality of candidate location chains based on the address of the plurality of candidate location chains stored in the plurality of address arrays, the selected candidate location chain having a candidate hash value, the candidate hash value being determined based on a particular hash value corresponding to an element in the selected candidate location chain, and
in response to the particular hash value being matched with the candidate hash value, determining the selected candidate location chain as the target location chain; and
acquiring the file from the memory based on the address of the target element.

14. The machine-readable medium of claim 13, wherein determining the hash value comprises:
calculating an initial hash value based on the identification; and
selecting, from the initial hash value, a predetermined number of consecutive bits as the hash value.

15. The machine-readable medium of claim 13, wherein determining from the target location chain the target element comprises:
   determining candidate identifications comprised in respective elements of the target location chain; and
   in response to the identification being matched with one of the candidate identifications, determining an element corresponding to the matched candidate identification as the target element.

* * * * *

UNITED STATES PATENT AND TRADEMARK OFFICE
CERTIFICATE OF CORRECTION

PATENT NO. : 11,200,204 B2
APPLICATION NO. : 16/285175
DATED : December 14, 2021
INVENTOR(S) : Yi Wang, Qingxiao Zhang and Lanjun Liao It is certified that error appears in the above-identified patent and that said Letters Patent is hereby corrected as shown below:

In the Claims

In Claim 1, Column 8, Line 51, delete "particular".

In Claim 1, Column 8, Line 53, delete "particular hash" and insert --determined hash--.

In Claim 3, Column 8, Line 66, delete "value the" and insert --value a--.

In Claim 9, Column 9, Line 51, delete "the memory," and insert --a memory,--.

In Claim 9, Column 9, Line 62, delete "particular".

In Claim 9, Column 9, Line 64, delete "particular hash" and insert --determined hash--.

In Claim 11, Column 10, Line 10, delete "the predetermined" and insert --a predetermined--.

In Claim 13, Column 10, Line 36, delete "the plurality" and insert --a plurality--.

In Claim 13, Column 10, Line 54, delete "particular".

In Claim 13, Column 10, Line 56, delete "particular hash" and insert --determined hash--.

Signed and Sealed this
Thirteenth Day of June, 2023

Katherine Kelly Vidal
*Director of the United States Patent and Trademark Office*